US007394939B2

(12) United States Patent
Abrams, Jr. et al.

(10) Patent No.: US 7,394,939 B2
(45) Date of Patent: Jul. 1, 2008

(54) MANAGING FILE STREAM GENERATION

(75) Inventors: Thomas Algie Abrams, Jr., Snohomish, WA (US); John Conrad, Auburn, WA (US)

(73) Assignee: Microsoft Corporation, Redmond, WA (US)

( * ) Notice: Subject to any disclaimer, the term of this patent is extended or adjusted under 35 U.S.C. 154(b) by 750 days.

(21) Appl. No.: 10/740,147

(22) Filed: Dec. 17, 2003

(65) Prior Publication Data
US 2005/0135682 A1    Jun. 23, 2005

(51) Int. Cl.
*H04N 5/228* (2006.01)
(52) U.S. Cl. ............ 382/232; 348/208.4; 348/211.11; 348/220.1; 348/229.1; 348/208.13; 382/236
(58) Field of Classification Search ............. 348/208.13
See application file for complete search history.

(56) References Cited

U.S. PATENT DOCUMENTS

| | | | | | |
|---|---|---|---|---|---|
| 5,159,455 | A | * | 10/1992 | Cox et al. ................. | 348/218.1 |
| 5,204,741 | A | * | 4/1993 | Sakaguchi ............... | 348/208.6 |
| 5,659,362 | A | * | 8/1997 | Kovac et al. ............. | 348/384.1 |
| 5,841,126 | A | * | 11/1998 | Fossum et al. ........... | 250/208.1 |
| 5,862,070 | A | * | 1/1999 | Shou et al. ................ | 708/820 |
| 5,940,131 | A | * | 8/1999 | Miyaji et al. ............. | 348/416.1 |
| 5,949,483 | A | * | 9/1999 | Fossum et al. ............. | 348/303 |
| 6,141,455 | A | * | 10/2000 | Matsuzawa et al. ........ | 382/250 |
| 6,396,539 | B1 | * | 5/2002 | Heller et al. .............. | 348/246 |
| 6,400,824 | B1 | * | 6/2002 | Mansoorian et al. ....... | 380/269 |
| 6,417,882 | B1 | * | 7/2002 | Mahant-Shetti ............ | 348/302 |
| 6,452,632 | B1 | * | 9/2002 | Umeda et al. ............. | 348/294 |
| 6,529,236 | B1 | * | 3/2003 | Watanabe ............... | 348/230.1 |
| 6,680,748 | B1 | * | 1/2004 | Monti .................... | 348/220.1 |
| 6,700,614 | B1 | * | 3/2004 | Hata ....................... | 348/345 |
| 6,757,019 | B1 | * | 6/2004 | Hsieh et al. .............. | 348/302 |
| 6,778,212 | B1 | * | 8/2004 | Deng et al. ............. | 348/222.1 |
| 6,785,411 | B1 | * | 8/2004 | Kitajima et al. ........... | 382/133 |
| 6,891,570 | B2 | * | 5/2005 | Tantalo et al. ............. | 348/362 |
| 6,933,973 | B1 | * | 8/2005 | Sako ...................... | 348/308 |
| 6,954,231 | B2 | * | 10/2005 | Mahant-Shetti ............ | 348/312 |
| 6,985,181 | B2 | * | 1/2006 | Ewedemi et al. ........... | 348/294 |
| 7,012,635 | B2 | * | 3/2006 | Umeda et al. ............ | 348/208.4 |
| 7,075,567 | B2 | * | 7/2006 | Hunter et al. ........... | 348/208.13 |
| 7,113,203 | B1 | * | 9/2006 | Wu et al. ............... | 348/207.99 |
| 2002/0050518 | A1 | * | 5/2002 | Roustaei .................. | 235/454 |
| 2002/0122488 | A1 | * | 9/2002 | Takahashi et al. ....... | 375/240.16 |
| 2002/0149693 | A1 | * | 10/2002 | Tantalo et al. ............. | 348/362 |
| 2005/0056699 | A1 | * | 3/2005 | Meier et al. .............. | 235/454 |
| 2005/0135682 | A1 | * | 6/2005 | Abrams et al. ............ | 382/232 |
| 2006/0007327 | A1 | * | 1/2006 | Nakamura et al. ......... | 348/239 |

OTHER PUBLICATIONS

"Sound and Video Compression Formats", Sep. 15, 2003, <URL: http://web.archive.org/web/20030915025909/http://www.brynmawr.edu/llc/help/cleaner5/formats.html>.*

(Continued)

*Primary Examiner*—Matthew C Bella
*Assistant Examiner*—Sath V. Perungavoor
(74) *Attorney, Agent, or Firm*—Lee & Hayes, PLLC

(57) ABSTRACT

An image capturing device is capable of capturing and encoding image data so as to output a streaming media file from the device. Vector information derived from the captured image data may be altered to change, i.e., the frame capture rate of subsequent image data, according to frame resolution requirements.

38 Claims, 5 Drawing Sheets

OTHER PUBLICATIONS

Brucek Khailany, et al., "Imagine: Media Processing With Streams," IEEE, vol. 21, No. 2, pp. 35-46, Mar.-Apr. 2001.

Gary Demos, "The Future of the Moving Image," SMPTE Journal, vol. 110, No. 6, pp. 383-394, Jun. 2001.

John D. Owens, et al., "Media Processing Applications on the Imagine Stream Processor," IEEE Computer Society, pp. 295-302, 2002.

Ujval J. Kapasi, et al., "The Imagine Stream Processor," IEEE Computer Society, pp. 282-289, 2002.

Steinmetz and Nahrstedt, "Chap 6, 4.2 Video Compression", retrieved on Oct. 20, 2003 at http://www.cs.sfu.ca/undergrad/CourseMaterials/CMPT479/material/notes/Chap4, 24 pgs.

Watson, "Image Compression Using the Discrete Cosine Transformation", Mathmatica Journal, 4(1), 1994, p. 81-88.

* cited by examiner

MANAGING FILE STREAM GENERATION

FIELD

The present invention is related to the management of file stream generation.

BACKGROUND

A substantial portion of present day video is captured by video cameras that utilize charge-coupled device (CCD) imagers to produce video signals requiring expensive signal processing in order for file-based video streams to be delivered to a receiving party.

For example, to encode the output of a video camera from one media facility to another facility for, e.g., a videoconference, presently known video transport methods require the output from a video camera to follow a transport path from the video camera to an analog-to-digital (A/D) converter, to a master signal router, to a fiber optic encoder, to a fiber pathway, to a fiber decoder, to another master signal router, to a digital-to-analog (D/A) converter, to a streaming media file encoder, and ultimately to an IP network. It is estimated that, at the time of filing the present disclosure, state-of-the art equipment for performing the above processing between the analog camera and the IP network costs up to $100,000 (U.S.).

Similarly cumbersome and expensive is the video transport path required for funneling the output of multiple security cameras to a centralized monitoring center. The video transport path for the video signals from such analog cameras begins at the respective monitoring cameras and proceeds to an analog multiplexer, to an analog router, to a microwave or coaxial cable, to an analog router, and to an analog display. It is estimated that, again at the time of filing the present disclosure, state-of-the art equipment for performing the above processing between each of the analog cameras and the analog display costs up to $15,000 (U.S.)

Accordingly, video signal processing associated with the examples described above include translation, routing, and storage that require numerous compressions, bandwidth reductions or signal translations in order to fit the video data into various storage or transport implementations. Examples of such processing include discrete cosine transform (DCT) compression within video tape recorders (VTRs); the RGB to YUV conversion for 4:2:2; and MPEG-2 compression for DTV transmission. Up to 90% of the cost for acquiring the resulting file based video for, e.g., videoconferencing, security monitoring, or even live television broadcasting, is spent between the photon capture unit and the encoder input for the numerous signal translation and processing stages.

SUMMARY

The generation and management of file streams are described herein.

In an image capturing device, image data is captured and encoded to be output as a streaming media file from the device. Vector information derived from the captured image data may be altered to change, i.e., the frame capture rate of subsequent image data, according to frame resolution requirements.

BRIEF DESCRIPTION OF THE DRAWINGS

The scope of the present invention will be apparent from the following detailed description, when taken in conjunction with the accompanying drawings, and such detailed description, while indicating embodiments of the invention, are given as illustrations only, since various changes and modifications will become apparent to those skilled in the art from the following detailed description, in which.

DETAILED DESCRIPTION

Figure 1:
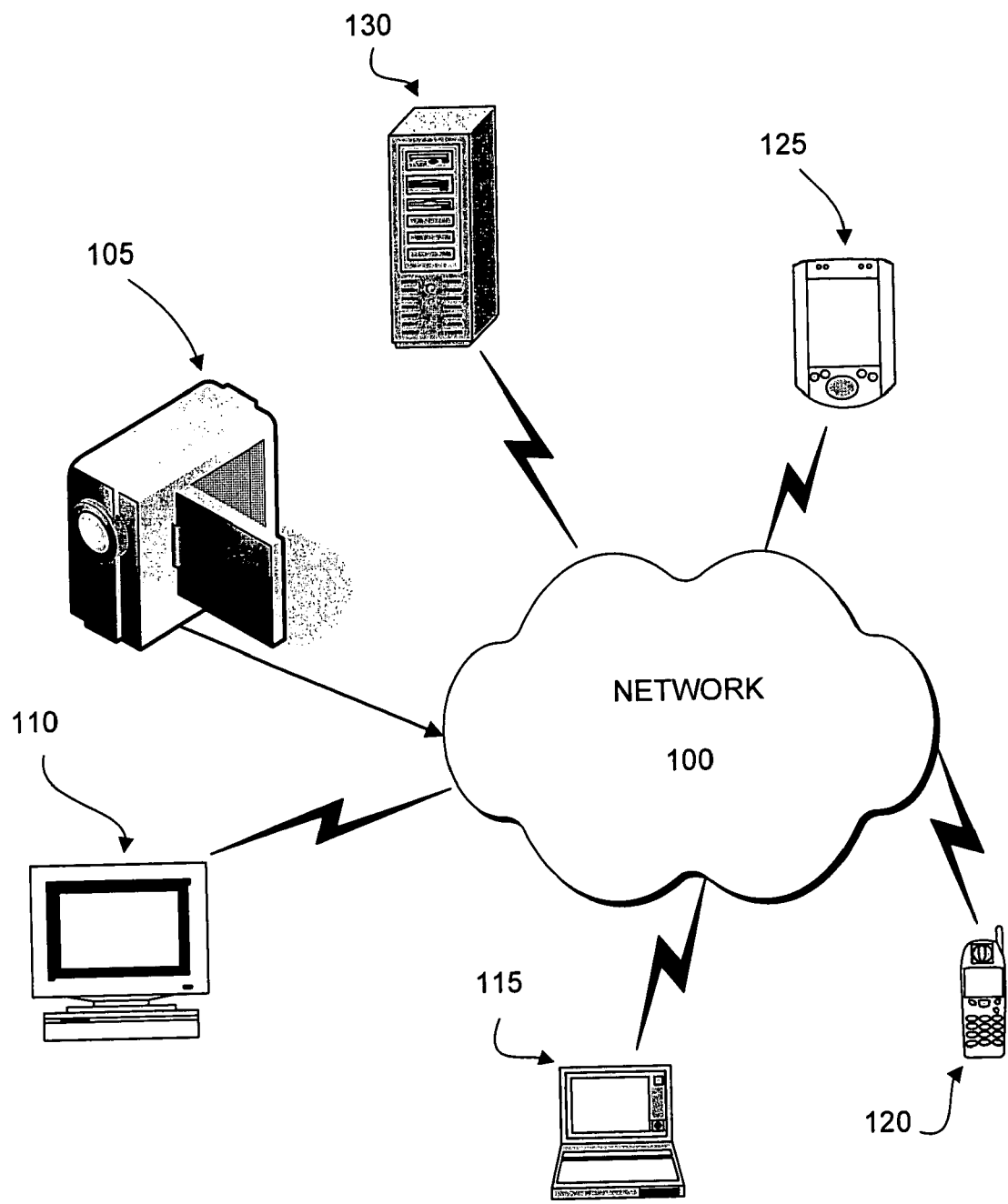
FIG. 1 shows a client/network system in accordance with example embodiments.

In the example network environment of FIG. 1, imager 105 is capable of streaming image data files to any one of client computing devices 110, 115, 120, and 125, which are also referred to as clients, as well as to server device 130 via network 100. Network 100 represents any of a variety of conventional network topologies and types, which may include wired and/or wireless networks. Network 100 may further utilize any of a variety of conventional network protocols, including public and/or proprietary protocols. Network 100 may include, for example, the Internet as well as possibly at least portions of one or more local area networks (LANs).

Imager 105 may be a camcorder or VTR (video tape recorder) that is capable of capturing analog or digital video image data. Examples of imager 105 include, but are not limited to, personal camcorders, security monitoring cameras, webcams, and television broadcasting cameras.

Computing device 110 may include any of a variety of conventional computing devices, including a desktop personal computer (PC), workstations, mainframe computers, Internet appliances, and gaming consoles. Further computing devices associated with network 100 may include a laptop computer 115, cellular telephone 120, personal digital assistant (PDA) 125, etc., all of which may communicate with network 100 by a wired and/or wireless link. Further still, one or more of computing devices 110, 115, 120 and 125 may include the same types of devices, or alternatively different types of devices. Server device 130, which may be a network server, an application server, or a combination thereof, may provide any of a variety of data and/or functionality to computing devices 110, 115, 120, 125, as well as to imager 105. The data may be publicly available or alternatively restricted (e.g., restricted to only certain users, available only if the appropriate fee is paid, etc.).

Figure 2:
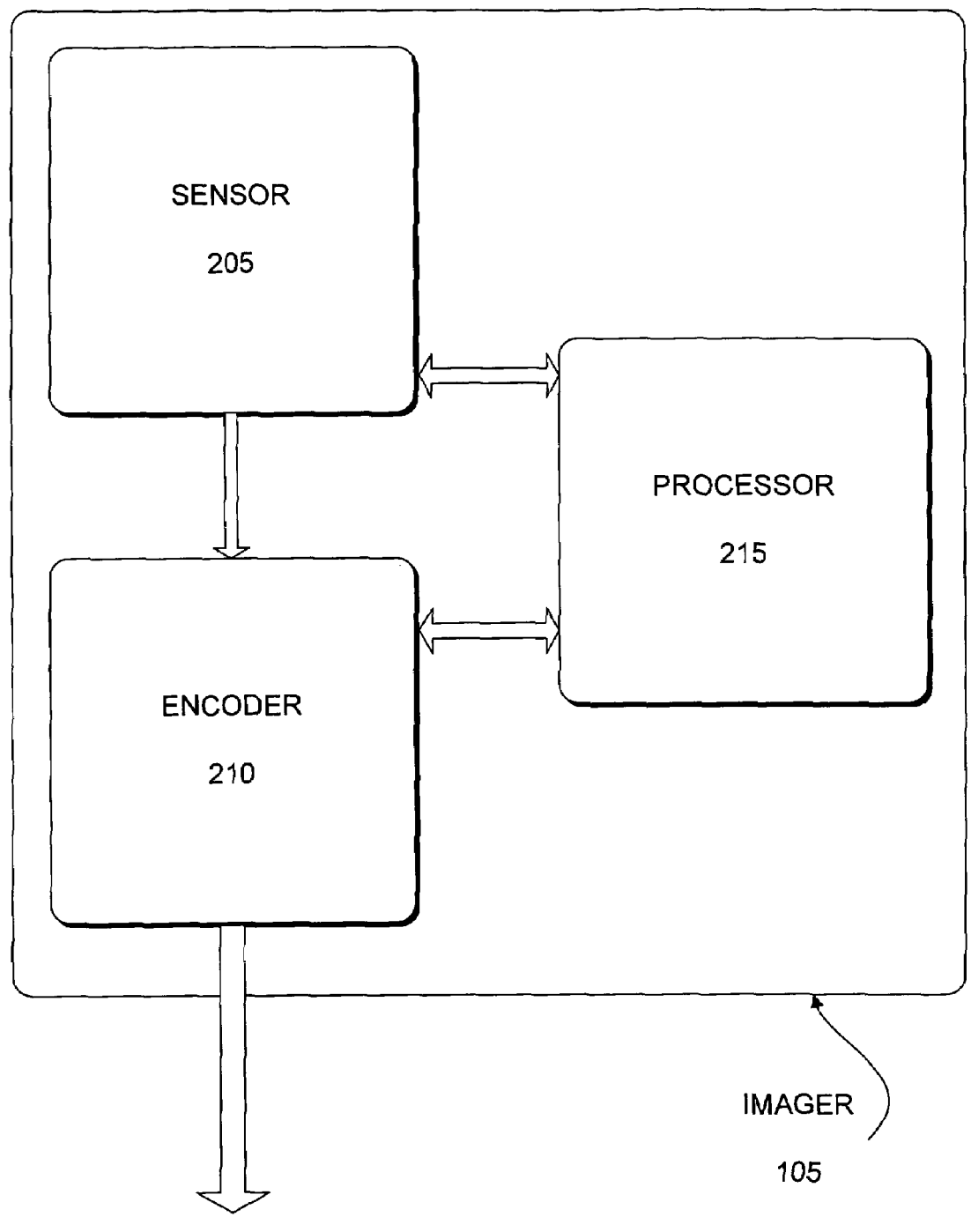
FIG. 2 shows an imager in accordance with an example embodiment.

FIG. 2 shows an example embodiment of imager 105. Imager 105 includes image sensor 205, encoder 210, and processor 215. Furthermore, image sensor 205, encoder 210, and processor 215 are incorporated within a single imager, on a single substrate or integrated circuit (IC). Alternatively, image sensor 205, encoder 210, and processor 215 are disposed on substrates or ICs, either singularly or in various combinations thereof, that are adjacent to each other within imager 105.

Image sensor 205, as employed by a preponderance of present-day video cameras is a charge coupled device (CCD), although alternative embodiments of video cameras may employ complementary metal oxide semiconductor (CMOS) devices. Both types of the aforementioned devices are contemplated by the example embodiments, although the present embodiment is described with reference to a CCD.

A CCD is an array or collection of light-sensitive diodes that convert photons (light) into electrons (electrical charge). The diodes are referred to as either photoelectric cells or photosites. Further, depending upon quality requirements for the image data, a CCD array includes any one of a 2×2, 4×4, 8×8, or 16×16 grouping of photoelectric cells. Each photoelectric cell is sensitive to light so that the electrical charge that accumulates at a particular photoelectric cell increases or decreases in direct proportion to the brightness of the light received at the particular photoelectric cell.

Encoder 210 is a media file encoder for executing an encoding algorithm to acquire full bandwidth rendering for a video image file to be stored in processor 215 of imager 105 or to be output from imager 105. The encoding algorithm may compress the captured image data into, e.g., a Windows Media File (WMF), QuickTime® file, and MPEG-2 file, or a next-generation MPEG file. A non-limiting example of such full bandwidth rendering includes RGB to YUV conversion for assembly as a 4:4:4, 4:2:2, 4:1:1, 4:2:0, or 8:8:8 streaming file, wherein Y, U, and V are samples packed together in macropixels, known in the art as a "macro-block," and stored in a single array. The "A:B:C" notation for YUV describes how often U and V are sampled relative to Y.

Processor 215 extracts vector information from encoder 210 to drive sensor 205 and encoder 210. For instance, processor 215 may monitor motion vector data, DCT coefficients, and changes in luminance or chroma; and utilize such data to revise the operation of imager 105, including performance parameters for sensor 205, to enhance specific applications for the subsequent capture of image data.

Further, the motion vector data may include image frame data corresponding to the image data captured by sensor 205. If the extracted image frame data does not comply with resolution requirements that are either input by a user or preset for the specific use of imager 105, processor 215 is able to revise the frame capture rate of subsequent image data by sensor 205. Thus, the close coupling of sensor 205, encoder 210, and processor 215 in accordance with the example embodiment implements a video camera having a variably-adjustable frame rate. Accordingly, such a video camera may be configured to occupy minimal processing resources during extended periods of little to no image capturing. But, when image activity increases, processor 215 may detect such increased activity and configure sensor 205 to optimally capture such images. That is, if motion vector content on sensor 205 increases, processor 215 may calculate an optimum frame rate to capture all time slots and reduce any motion blur to an acceptable level. Such calculation balances current light energy against the sensitivity of sensor 205 and shutter speed. These calculations are not included in conventional automatic exposure settings.

As an example, a conventional security camera monitoring a large outdoor area is able to resolve the images of the monitored area well during daylight hours. As daylight dissipates, automatic exposure functions of the camera adjust the aperture to keep the image 'bright'. However, at a particular level of light, or more precisely an absence of light, the sensitivity limit of the camera is reached and further aperture adjustment is not possible. Thus, the camera may have to apply electronic gain to render the image viewable. Unfortunately, gain is accompanied by noise, thus compromising the image.

On the other hand, with an example embodiment of imager 105 in the security camera, when the light levels descend to levels low enough that gain might be applied as with a conventional camera, the camera with imager 105 may be programmed to reduce the frame rate before applying gain, resulting in longer exposure times and cleaner images without the noise caused by gain. If motion vector activity increases, the camera may switch to a faster frame rate coupled with gain. As gain is applied, if the integrity of the motion vector content dissipates, processor 215 is able to recognize that the noise is obscuring the object that is moving, and thus a dynamic best-compromise setting can be reached that preserves as much detail of the moving object as possible with as bright an image as possible.

As a further example, contrary to conventional cameras that adjust a whole picture at one time, a camera having imager 105 is able to arrange different exposures across sensor 205, which close-couples image processing to small areas of the image, i.e. macroblocks. Thus, in an industrial environment that is being monitored, in which there are extreme variances in light levels, e.g., a welding monitor camera where a heated area is typically very bright but a surrounding area is dark, an example embodiment of processor 215 may program sensor 205 to reduce an integration time in areas of the image that are very bright, e.g., in a welding area, and allow longer integration times in the darker areas of the image. The resulting image could show, simultaneously, guide markings in the material that are not illuminated well, a hot welding area, and a cooling weld seam glowing a dull red. That is, processor 215 could program compression and frame rate settings to optimally preserve the area of interest in the image, or cycle through best presentation of each area type automatically.

Further still, processor 215 is able to apply digital rights management (DRM) application to the media file encoded by encoder 210. A non-limiting example of a DRM application is the Windows® Media® DRM Series by the Microsoft® Corporation. DRM, as is known in the art, is a set of technologies that content owners can use to protect their copyrighted materials, such as the media files produced by imager 105. DRM is implemented as an application to encrypt digital media content to thereby limit access to only those parties having acquired a proper license to download the media file content. As an alternative, "watermarks" enable an encoder to add proprietary information, such as a copyright or artist's name, to an audio and/or video file stream without being audible or visible to an end user. A watermark is preserved in the encoded file if the file is copied or encoded again, and therefore can be read from the file to verify the source and/or authenticity of the file. Further details of DRM technology are not necessary for implementation of the present example, other than that processor 215 may apply, or "wrap," a particular DRM application on a media file encoded by encoder 210. Thus, imager 105 is able to stream media file content that is securely distributed in a network environment.

Figure 3:
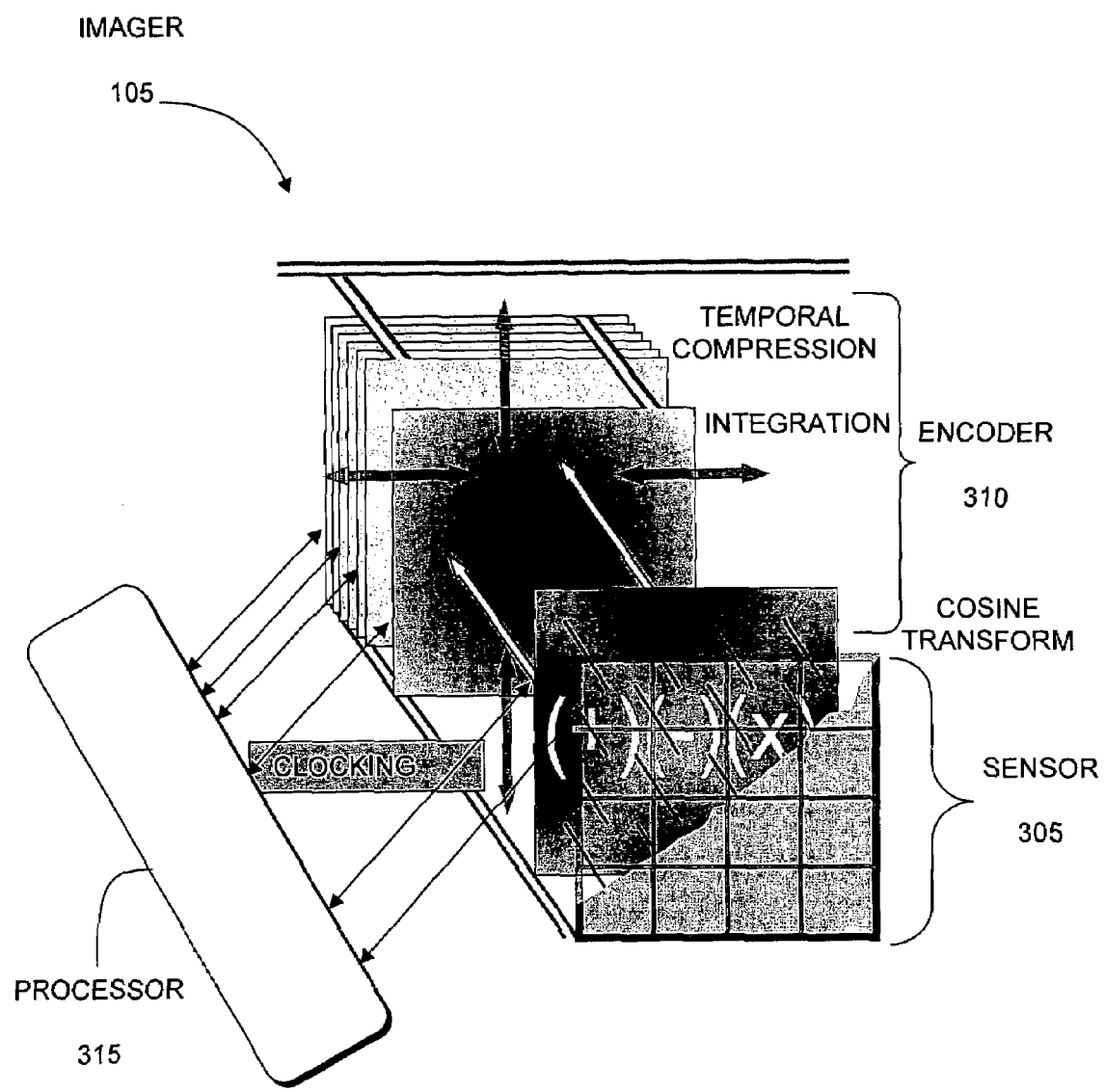
FIG. 3 shows an example of an imager further to the example of FIG. 2.
Figure 4:
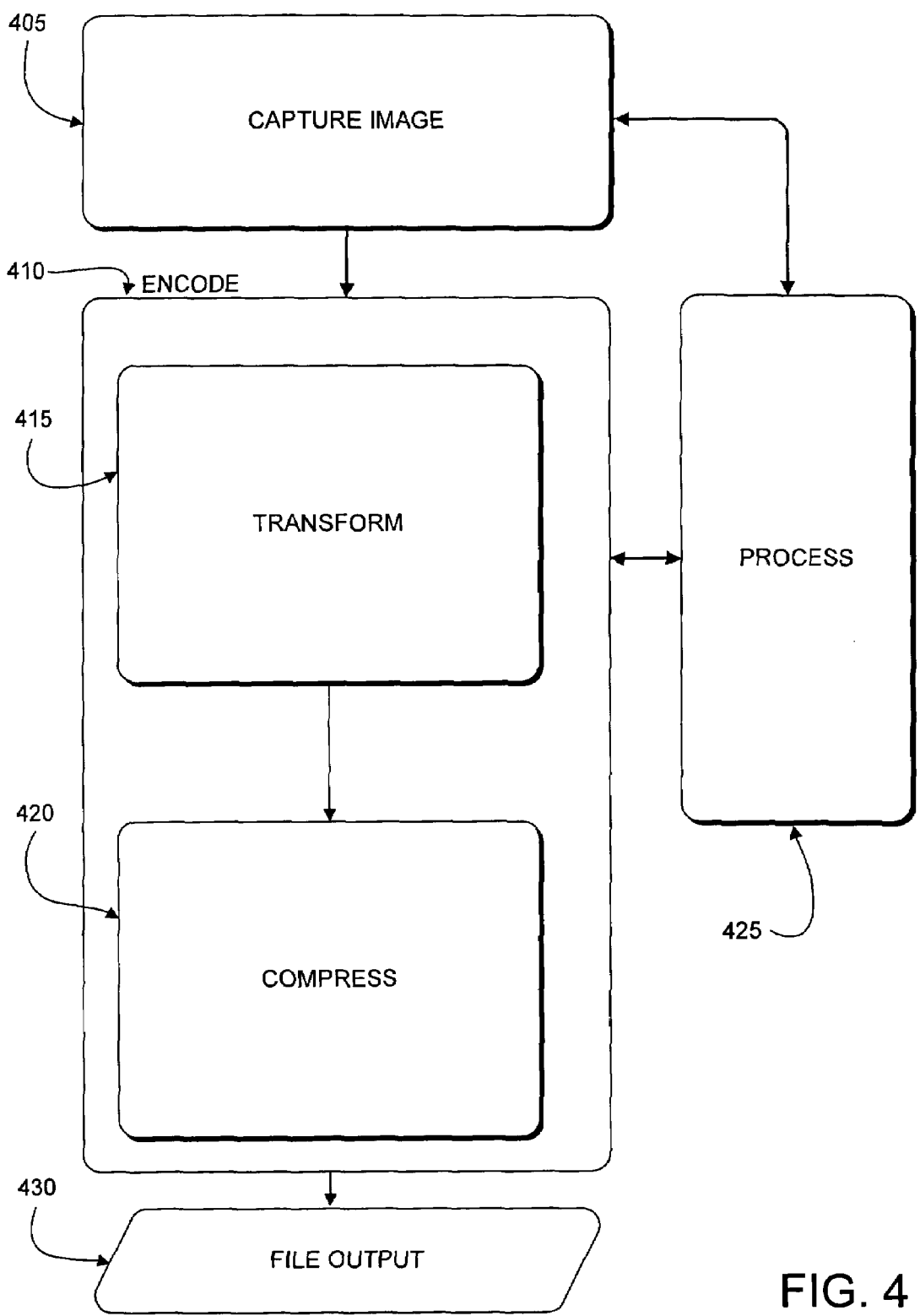
FIG. 4 shows an example embodiment of processing for file stream generation and management thereof.

FIG. 4 illustrates an example embodiment of the processing implemented by the imager of FIG. 3, which is a more detailed embodiment corresponding to the example of FIG. 2.

In particular, image data is captured 405 as photons enter through a lens of sensor 205 and are focused onto one or more CCD arrays, each comprised of columns and rows of photoelectric cells. Encoding 410 of the charge from each of the photoelectric cells includes each of the charges being extracted and being input for a discrete cosine transform (DCT) in encoder 310. The transformed 415 cosine data is digitized and passed onto an integration layer within encoder 310. At the integration layer, which is software-controlled by processor 315, the macro-block is compressed 420 in accordance with a compression scheme including at least any one of WMF, MPEG-2, or next generation MPEG.

Coincident with each video frame, or substantially simultaneously, the integrated cosine transform is processed 425 in temporal compression frame stores that store, process and integrate these samples over time. Extracted motion vector information including, e.g., frame capture rate, controls the capture frame rate of sensor 305 with regard to the subsequent capture of image data. Accordingly, a dynamic frame rate of imager 105 is adjustable to meet temporal resolution requirements that are set by an operator or are pre-set for a particular application. For example, during times of infrequent activity as recorded by a security camera late at night, the resolution requirements are quite low, and therefore little or no data would stream from the imager 105. However, during times of frequent activity as recorded by the security camera during peak business hours, the resolution requirements are increased dramatically, and therefore the frame capture rate of the imager 105 would be adjustably increased to keep the number and degree of motion vectors within the input or preset limits.

Once encoding 410 is complete and under control of software and internal clocking, data corresponding to each individual macro-block is passed out of the device, as a 4:4:4 (4:2:2, 4:1:1, 4:2:0, 8:8:8) streaming file 430.

According to an example embodiment, imager 105 may stream the output image file 430 to any one of client devices (see FIG. 1) 110, 115, 120, and 125, as well as to server device 130 utilizing at least one of the following transport protocols: HTTP (hypertext transport protocol) to deliver an image file as web page content; FTP (file transport protocol) to deliver an image file as a file downloads; or even SMTP (simple mail transfer protocol) to deliver an image file in an e-mail attachment.

Figure 5:
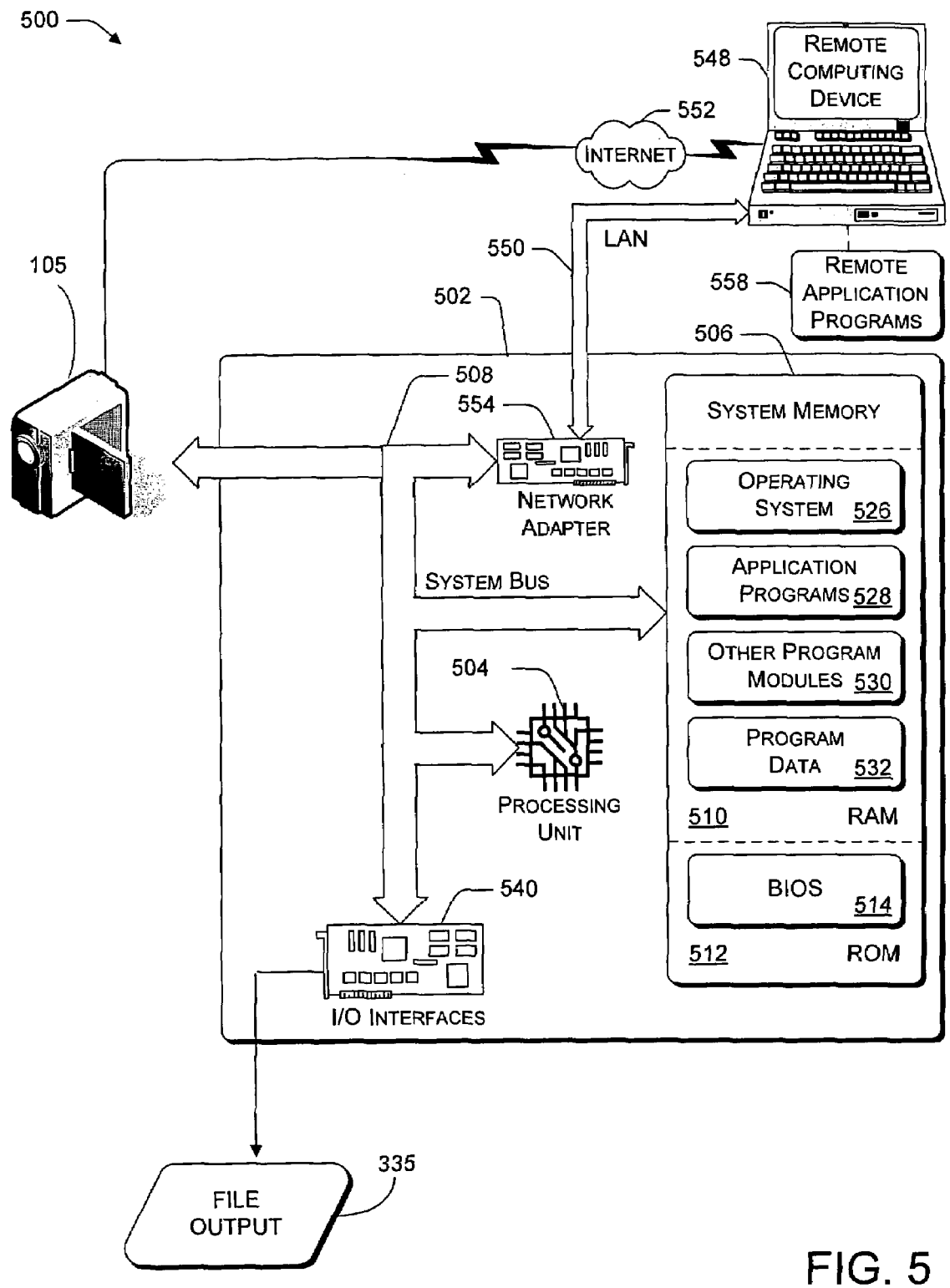
FIG. 5 illustrates a general processing network environment which can be used to implement the techniques described herein.

FIG. 5 illustrates a general processing environment 500, which can be used to implement the techniques described herein. The processing environment 500 is only one example of a processing environment and is not intended to suggestively limit the scope of use or functionality of the processor and network architectures. Neither should the processing environment 500 be interpreted as having any dependency or requirement relating to any one or combination of components illustrated in the example processing environment 500.

Processing environment 500 includes a general-purpose processing device in the form of processor 502, which may or may not be incorporated within imager 105. The components of computer 502 can include, but are not limited to, one or more processors or processing units 504, system memory 506, and system bus 508 that couples various system components including processor 504 to system memory 506.

System bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Processor 502 may include a variety of computer readable media. Such media can be any available media that is accessible by processor 502 and includes both volatile and non-volatile media, removable and non-removable media.

System memory 506 includes computer readable media in the form of volatile memory, such as random access memory (RAM) 510, for storing an operating system 526, application programs, e.g., DRM, 528, other program modules 520, and program data 532; and/or non-volatile memory, such as read only memory (ROM) 512 or flash RAM. Basic input/output system (BIOS) 514, containing the basic routines that help to transfer information between elements within processor 502, such as during start-up, is stored in ROM 512 or flash RAM. RAM 510 typically contains data and/or program modules that are immediately accessible to and/or presently operated on by processing unit 504.

Processor 502 may also include other removable/non-removable, volatile/non-volatile computer storage media. By way of example, processor 502 may include or be coupled to a port or drive for reading from and writing to: video tape cassettes, optical discs or other optical media, memory sticks, memory modules, etc.

Processor 502 can operate in a networked environment using logical connections to one or more remote computers, such as remote computing device 548. By way of example, remote computing device 548 can be a PC, portable computer, a server, a router, a network computer, a peer device or other common network node, and the like. That is, remote computing device may include any of client devices 110, 115, 120, 125, and server device 130, shown in FIG. 1. Alternatively, computer 502 can operate in a non-networked environment as well.

Logical connections between processor 502 and remote computer 548 are depicted as LAN 550 and a general WAN 552. Such networking environments are commonplace in offices, enterprise-wide computer networks, intranets, and the Internet.

When implemented in a LAN networking environment, processor 502 is connected to local network 550 via network interface or adapter 554. When implemented in a WAN networking environment, processor 502 typically includes means for establishing communications over a wide network 552, e.g., a modem (not shown), which can be internal or external to processor 502, and can be connected to system bus 508 via I/O interfaces 540 or other appropriate mechanisms. It is to be appreciated that other means of establishing at least one communication link between processor 502 and remote computing device 548 can be employed.

In a networked environment, such as that illustrated with processing environment 500, program modules depicted relative to processor 502, or portions thereof, may be stored in a remote memory storage device. By way of example, remote application programs 558 reside on a memory device of remote computer 548. For purposes of illustration, applications or programs and other executable program components such as the operating system are illustrated herein as discrete blocks, although it is recognized that such programs and components reside at various times in different storage components of processor 502, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed:

1. An imager to manage file stream generation, comprising:
   a sensor to capture image data;
   an encoder to transform the captured image data into a media file; and
   a processor to extract and process image frame data from the captured image data, wherein the processor is to compare the image frame data with resolution requirements stored therein, and to adjust a frame capture rate for the sensor if the captured image data does not comply with the resolution requirements, wherein adjusting the frame capture rate includes balancing current light energy against a sensitivity of the sensor, wherein the processor further includes extracting motion vector information from the media file and adjusting the frame capture rate for capturing subsequent image data in accordance with the motion vector information, wherein the frame capture rate is high when motion vector is relatively large and the frame capture rate is low when motion vector is relatively small.

2. An imager according to claim 1, wherein the processor is configured to monitor motion vector data, the processor further calculating an optimum frame rate to capture all time slots and to reduce motion blur in response to the motion vector data.

3. An imager according to claim 1, wherein the processor is further to apply a digital rights management (DRM) application to the media file prior to the media file being output by the imager.

4. An imager according to claim 1, wherein the sensor, the encoder, and the processor are disposed on a same substrate.

5. An imager according to claim 1, wherein, to transform the captured image data into a media file, the encoder is to:
   extract a charge directly corresponding to an amount of light on each photoelectric cell in a charge-coupled device (CCD) array in the sensor; and
   transform the extracted charge for each of the cells in the CCD array.

6. An imager according to claim 5, wherein, to transform the extracted charge for each of the cells in the CCD array, the encoder to is to execute a discrete cosine transform (DCT) for each cell in the CCD array.

7. An imager according to claim 5, wherein, to extract image frame data from the captured image data, the processor is to integrate the transformed charges over time to derive a capture frame rate of the sensor.

8. An imager according to claim 1, wherein, to transform the captured image data into a media file, the encoder is to compress the captured image data into a Windows Media File (WMF).

9. An imager according to claim 1, wherein, to transform the captured image data into a media file, the encoder is to compress the captured image data into an MPEG-2 file.

10. An imager according to claim 1, wherein, to transform the captured image data into a media file, the encoder is to compress the captured image data using a next generation MPEG compression scheme.

11. In an image capturing device, a method of generating an image file, comprising:
   capturing image data;
   encoding each portion of the captured image data into a media file;
   deriving motion vector information from the media file;
   adjusting a frame capture rate to comply with dynamic resolution requirements and balance a current light energy against a sensitivity of a sensor; and
   capturing subsequent image data in accordance with the motion vector information, wherein the frame capture rate is high when motion vector is relatively large and the frame capture rate is low when motion vector is relatively small.

12. A method according to claim 11, wherein adjusting the frame capture rate in diminishing light levels includes reducing the frame rate before applying gain.

13. A method according to claim 11, further comprising processing the media file in accordance with a DRM application.

14. A method according to claim 11, wherein the method is executed on a single integrated circuit.

15. A method according to claim 11, wherein capturing image data includes:
   accumulating a charge on at least one photoelectric pickup cell in a CCD array;

extracting the charge from each of the at least one cell; and transforming the extracted charge for each of the at least one cell.

16. A method according to claim 15, wherein transforming the extracted charge includes executing a DCT.

17. A method according to claim 15, wherein deriving the motion vector information from the media file includes integrating the transformed charges over time to derive a frame capture rate corresponding to the captured image data.

18. A method according to claim 11, wherein encoding each portion of the captured image data includes contracting the captured image data.

19. A method according to claim 11, wherein encoding each portion of the captured image data includes compressing the captured image data into a WMF.

20. A method according to claim 11, wherein encoding each portion of the captured image data includes compressing the captured image data into an MPEG-2 file.

21. A method according to claim 11, wherein encoding each portion of the captured image data includes compressing the captured image data using a next generation MPEG compression scheme.

22. In an imager for managing file stream generation, a computer-readable storage medium having one or more instructions causing one or more processors to:
    transform a charge captured at each photoelectric cell in an image sensor;
    encoding the transformed charge from each cell to produce a media stream file;
    reading motion vector information from the media file; and
    causing one or more processors to detect image activity and to change the rate at which a subsequent charge is captured at a portion of the photoelectric cells in the image sensor based on increased image activity, wherein the change includes adjusting a frame capture rate for capturing subsequent image data in accordance with the motion vector information, wherein the frame capture rate is high when motion vector is large and the frame capture rate is low when motion vector is small.

23. A computer-readable storage medium according to claim 22, wherein the one or more processors calculate an optimum frame rate to capture all time slots and reduce any motion blur of an image.

24. A computer-readable storage medium according to claim 22, wherein the one or more instructions further cause one or more processors to apply a DRM application to the media stream file.

25. A computer-readable storage medium according to claim 22, wherein to transform the extracted charge from each photoelectric cell in the image sensor is to execute a DCT.

26. A computer-readable storage medium according to claim 22, wherein the media stream file is a WMF.

27. A computer-readable storage medium according to claim 22, wherein the media stream file is an MPEG file.

28. A computer-readable storage medium according to claim 22, wherein the media stream file is a next-generation MPEG file.

29. An imager to manage file stream generation, comprising:
    means for capturing image data;
    means for transforming the captured image data into a media file including,
        means for extracting an analog charge directly corresponding to an amount of light on each photoelectric cell in a CCD array; and
        means for transforming the extracted charge for each of the cells in the CCD array;
    means for gathering and processing image frame data from the captured image data;
    means for reading motion vector information from the media file; and
    means for adjusting a frame capture rate for capturing subsequent image data in accordance with the motion vector information, wherein the frame capture rate is high when motion vector is relatively large and the frame capture rate is low when motion vector is relatively small.

30. An imager according to claim 29, further comprising means to output the media file in accordance with a DRM application.

31. An imager according to claim 29, wherein means for adjusting the frame capture rate in diminishing light levels includes reducing the frame rate before applying gain.

32. An imager according to claim 29, wherein the means for transforming executes a DCT.

33. An imager according to claim 29, wherein the means for transforming the captured image data includes means for integrating the transformed charges over time to derive the frame capture rate of the imager.

34. An imager according to claim 29, wherein the media file is a WMF.

35. An imager according to claim 29, wherein the media file is an MPEG file.

36. An imager according to claim 29, wherein all of the means are controlled by software.

37. An imager according to claim 29, wherein all of the means are hardware-implemented.

38. A method of generating different exposures across an image file, comprising:
    capturing image data;
    encoding a plurality of portions of the captured image data into a media file;
    deriving motion vector information from the media file; and
    adjusting a frame capture rate to comply with particular resolution requirements and balance a current light energy against a sensitivity of a sensor for each of a first portion of the sensor and a second portion of the sensor, the first portion of a sensor configured to receive image information at a first rate and the second portion of the sensor configured to receive image information at a second rate, and to adjust the frame capture rate for capturing subsequent image data in accordance with the motion vector information, wherein the frame capture rate is high when motion vector is relatively large and the frame capture rate is low when motion vector is relatively small.

* * * * *